M. F. WICKERSHAM.
Dumping Wagon.
No. 94,681.
Patented Sept. 7, 1869.
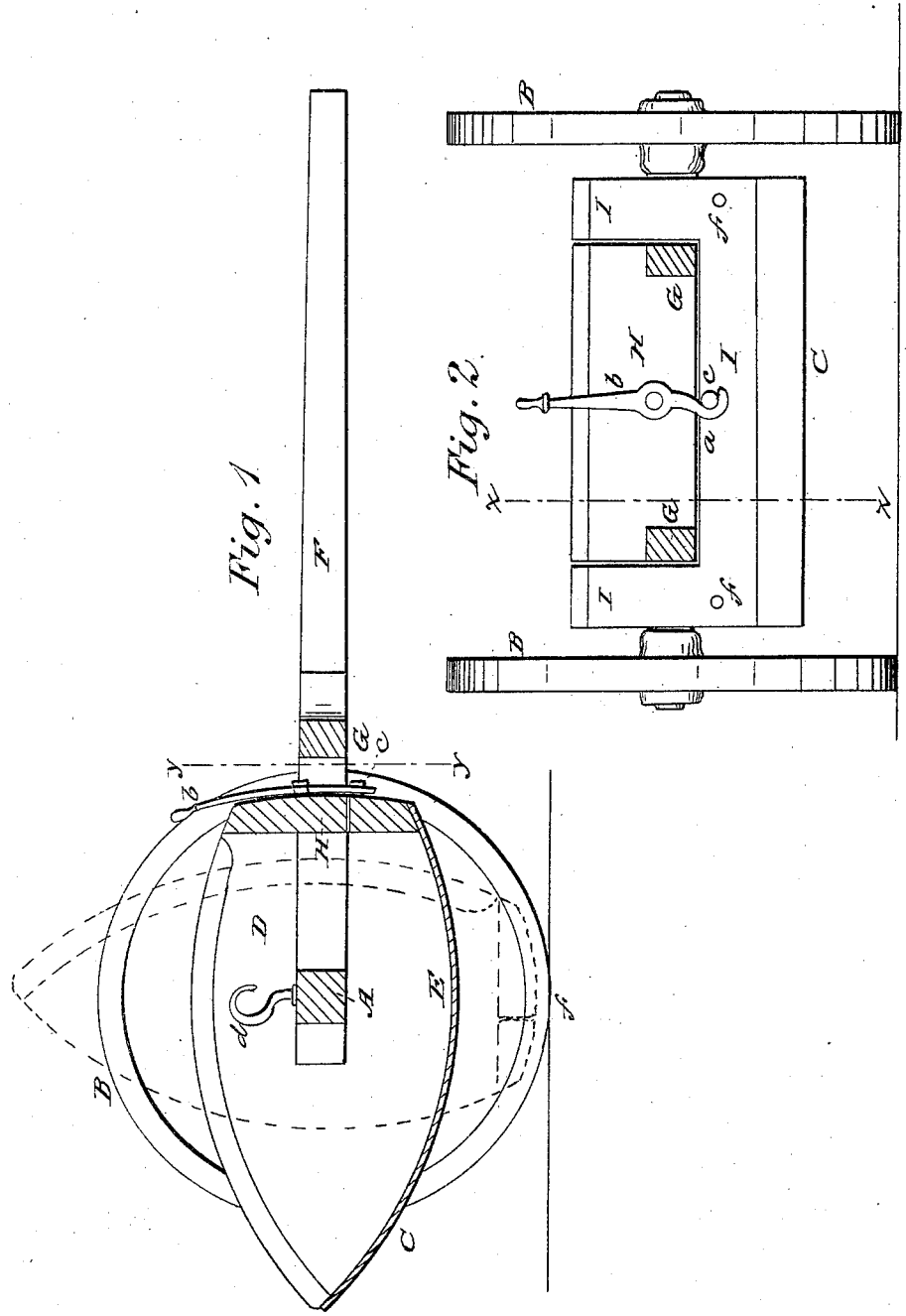
Witnesses:
Inventor:

United States Patent Office.

M. F. WICKERSHAM, OF SPRINGFIELD, ILLINOIS, ASSIGNOR TO HIMSELF, THOMAS ECKARDT, H. F. ELDRED, J. G. LAW, T. HUTCHINSON, C. B. HURD, C. DRESSER, AND D. SHERMAN.

Letters Patent No. 94,681, dated September 7, 1869.

IMPROVEMENT IN DUMPING-CART.

The Schedule referred to in these Letters Patent and making part of the same.

*To all whom it may concern:*

Be it known that I, M. F. WICKERSHAM, of Springfield, in the county of Sangamon, and State of Illinois, have invented a new and useful Dumping-Cart; and I do hereby declare the following to be a full, clear, and exact description thereof, which will enable others skilled in the art to make and use the same, reference being had to the accompanying drawings, forming part of this specification, in which—

Figure 1 is a longitudinal section of my improved dumping-cart, taken in the plane of the line x x, fig. 2; and Figure 2 is a transverse section of the same, in the line y y, fig. 1.

Similar letters of reference indicate corresponding parts in the several figures of the drawing.

This invention relates to a dumping-cart designed for use with my improved street-sweeping machine, for which I have made application for Letters Patent, bearing even date herewith. It is, however, equally applicable to all other purposes for which dumping-carts are usually employed.

The invention consists principally in arranging the main portion of the body of the cart below the axle, in such a manner as to receive the dirt from its rear end, at a comparatively short distance above the ground, and, when full, to be swung upon the axle, for dumping or discharging its contents by the gravity of the latter, and the forward movement of the cart.

In the accompanying drawings—

A is the axle, and B, the wheels of a dumping-cart, of ordinary or suitable construction.

C is the body of the cart, composed of the side-pieces D, and curved bottom E.

The side pieces are elliptical in form, with their forward ends cut off to form the perpendicular front of the body.

The bottom may be constructed of sheet-metal, or other suitable material. In this example of my invention, I employ sheet-metal, bent to conform to the lower edges of the side pieces, to which it is firmly secured, in any convenient manner.

The body is hung upon the axle, between the wheels, by passing the ends of said axle through the side pieces, at about the centre of the latter, as clearly shown in fig. 1.

The ends of the axle are rounded, to permit the side pieces to turn freely thereon.

F are the thills or shafts of the cart, secured to the axle in the ordinary manner, but provided, near the cross-bar G, with a fixed board, H, arranged parallel with the cross-bar, at such a distance in rear thereof as to fit within the recess *a*, in the front end-board I, attached to the side pieces, and, together with said board, form the front end of the cart-body.

The boards H and I are locked together by means of the lever *b*, pivoted to the former, and adapted to catch over the pin *c*, affixed to the latter, as clearly shown in fig. 2.

*d* is a hook, attached to the upper side of the axle, by which the cart is attached to the street-sweeping machine, hereinbefore mentioned.

If desired, the axle A may be bent upward between the ends of the thills, in order to increase the capacity of the cart.

It will be observed, that by hanging the body C upon the axle, in the manner described, its bottom E is much below the axle, and that its rear end is but a short distance above the ground, so that the labor of filling the cart is greatly lessened. This will be found of great advantage in the construction of railroads, where the dirt is generally thrown into dumping-carts by means of shovels.

The cart is dumped by releasing the catch *b c*, when the gravity of the dirt or load will throw the forward end of the body downward into the position represented by dotted lines, fig. 1.

As the cart is drawn forward, the front end of the body will be brought nearly in contact with the ground, into which the projecting pins *f* will catch, and as the cart continues to move forward, said front end of the body will be carried thereby so far backward as to permit the ready and complete discharge of the load.

It will be noticed that the distance from the front end of the body to the centre of the axle upon which it turns, is of a length nearly equal to the radius of the wheels B, and that, therefore, the body will easily clear the ground in the operation of dumping.

The body C is so hung upon the axle that, when empty, its rear end will hold the front-board I in contact with the fixed board H upon the thills.

My improved dumping-cart is simple and economical in construction, easily operated by a common laborer, and will reduce the fatigue attending the use of the ordinary dumping-cart, in an appreciable degree.

Having thus described my invention,

What I claim as new, and desire to secure by Letters Patent, is—

A dumping-cart, having its body hung upon the axle, as described, and adapted to be dumped forward by the gravity of the load, substantially as herein set forth, for the purpose specified.

The above specification signed by me, this 22d day of July, 1869.

M. F. WICKERSHAM.

Witnesses:
  A. BERNSTEIN,
  JOHN A. SILENCE.